United States Patent [19]

Brum

[11] Patent Number: 5,836,535
[45] Date of Patent: Nov. 17, 1998

[54] TOWED VEHICLE DEPLOYMENT APPARATUS INCORPORATING MECHANICAL BRAKE

[75] Inventor: Roger D. Brum, Irvine, Calif.

[73] Assignee: Southwest Aerospace Corporation, Tustin, Calif.

[21] Appl. No.: 773,918

[22] Filed: Dec. 27, 1996

Related U.S. Application Data

[63] Continuation of Ser. No. 213,908, Mar. 14, 1994, abandoned.

[51] Int. Cl.$^6$ ................................................ B65H 75/30
[52] U.S. Cl. ............................... 242/381.5; 188/185
[58] Field of Search ..................... 242/396.6, 381.5, 242/128; 188/184, 185; 267/148, 149

[56] References Cited

U.S. PATENT DOCUMENTS

| | | | |
|---|---|---|---|
| 715,691 | 12/1902 | Porter, Jr. . | |
| 1,206,676 | 11/1916 | Cote . | |
| 1,531,926 | 3/1925 | Hallot . | |
| 2,119,550 | 6/1938 | Loughridge | 188/180 |
| 2,156,294 | 5/1939 | Kessenich | 102/24 |
| 2,396,071 | 3/1946 | Anderson et al. | 254/173 |
| 2,448,343 | 8/1948 | Zandmer | 102/92.5 |
| 2,486,999 | 11/1949 | Tapp et al. | 258/1.2 |
| 2,953,377 | 9/1960 | Brust | 273/105.3 |
| 2,967,683 | 1/1961 | Crater | 244/110 A |
| 2,967,688 | 1/1961 | Crater | 244/220 |
| 2,998,754 | 9/1961 | Bialy | 89/1.7 |
| 3,188,052 | 6/1965 | Longworth | 254/157 |
| 3,587,474 | 6/1971 | Fuchs | 104/173 |
| 3,589,632 | 6/1971 | Rew | 242/55 |
| 3,610,096 | 10/1971 | Bauman et al. | 89/1.808 |
| 3,871,321 | 3/1975 | Giebel et al. | 114/221 A |
| 4,029,298 | 6/1977 | Lassche | 254/158 |
| 4,062,112 | 12/1977 | Lake | 30/228 |
| 4,416,429 | 11/1983 | Jessamine | 242/86.5 A |
| 4,469,196 | 9/1984 | Sadler | 182/236 |
| 4,500,048 | 2/1985 | Schaller | 242/107.3 |
| 4,607,849 | 8/1986 | Smith et al. | 273/348.1 |
| 4,718,320 | 1/1988 | Brum | 89/1.11 |
| 4,718,329 | 1/1988 | Brum | 89/1.11 |
| 4,770,368 | 9/1988 | Yates et al. | 244/1 TD |
| 4,993,276 | 2/1991 | Edwards | 74/411.5 |

*Primary Examiner*—Donald P. Walsh
*Assistant Examiner*—William A. Rivera
*Attorney, Agent, or Firm*—Stetina Brunda Garred & Brucker

[57] ABSTRACT

A towed vehicle deployment apparatus comprising a rotatable spool defining a rotor portion. The spool is rotatably connected to a stationary brake drum in a manner wherein the cylindrical outer surface of the rotor portion is disposed in sliding contact with the cylindrical inner surface of the brake drum. Dispensably stored in windings about the spool is a tow line having a decoy connected thereto. Disposed within the rotor portion of the spool is a brake assembly comprising at least one brake element which is adapted to yield at a predetermined rotational speed of the spool and move radially outward upon yielding so as to contact the inner surface of the brake drum and apply a braking force to the spool.

8 Claims, 1 Drawing Sheet

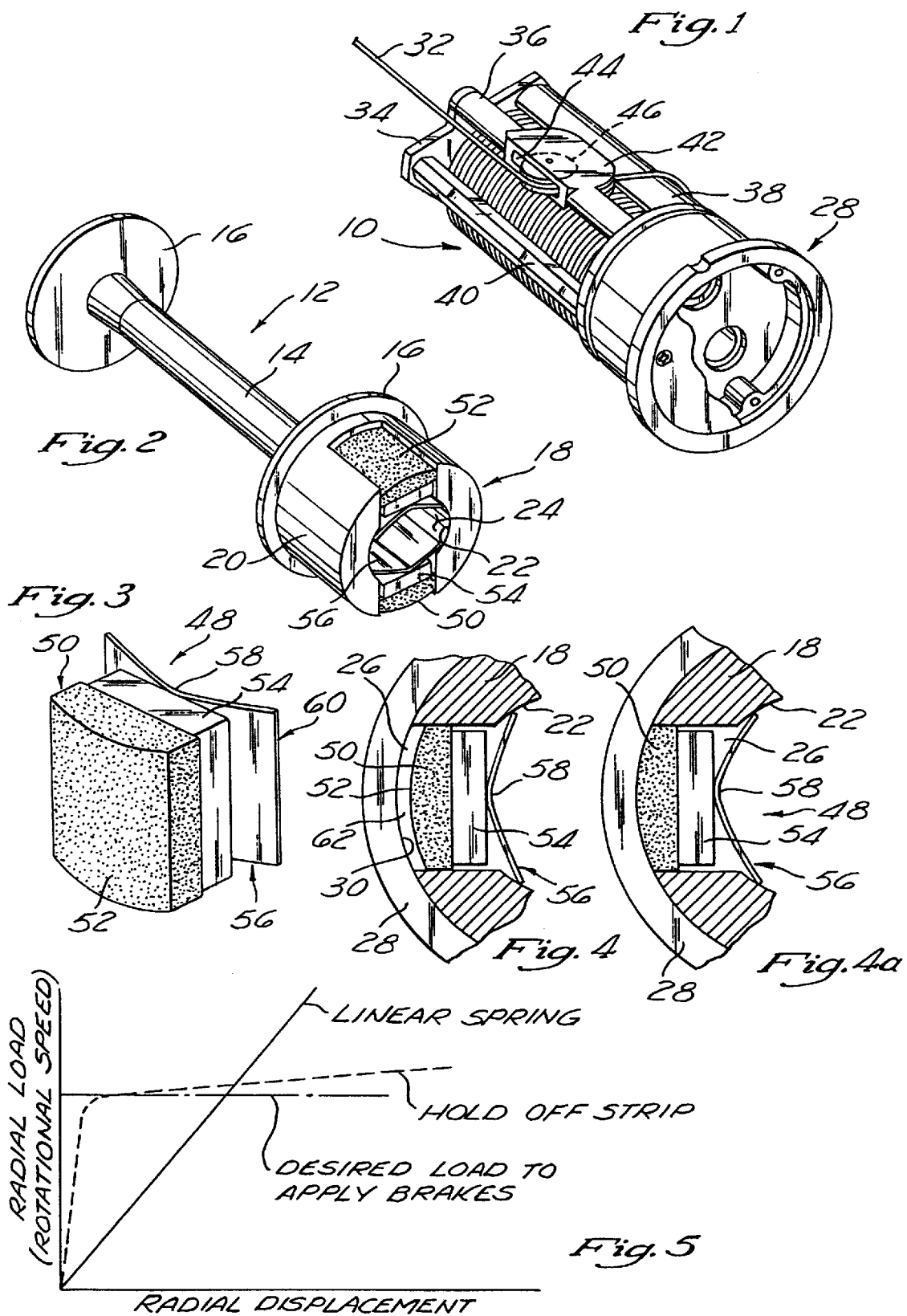

TOWED VEHICLE DEPLOYMENT APPARATUS INCORPORATING MECHANICAL BRAKE

This application is a continuation of application Ser. No. 08/213,908 filed on Mar. 14, 1994 now abandoned.

FIELD OF THE INVENTION

The present invention relates generally to towed vehicles, such as aerial targets and expendable decoys, and, more particularly, to a mechanically braked towed vehicle deployment device used to deploy such towed vehicles behind military aircraft.

BACKGROUND OF THE INVENTION

In military applications, two types of towed vehicles are well-known and often used for weapon/gunnery practice and aircraft protection. These vehicles are aerial towed targets and aerial towed decoys, respectively. Aerial towed targets are typically towed behind an aircraft and used in conjunction with pilot training exercises. Aerial towed decoys are used to draw various types of guided weapons away from an aircraft that the weapons are intended to destroy and/or used to evaluate the effectiveness of guided weapon systems. An example of an aerial target is shown in U.S. Pat. No. 4,205,848 to Smith et al., with examples of aerial decoys being shown in U.S. Pat. No. 4,718,320 to Brum and U.S. Pat. No. 4,852,455 to Brum, the disclosures of which are incorporated herein by reference.

Aerial towed targets and decoys which include electronic devices and circuitry incorporated therein have been known in the prior art for many years. In particular, aerial targets often include various electronic devices which are used for purposes of scoring the pilot's performance during a training exercise. Electronic decoys contain various types of electronic circuits to create an apparent target to a weapon to attract the weapon to the decoy, rather than the aircraft. One such active electronic device is a transponder which is adapted to receive radar signals and rebroadcast an amplified return signal. In addition to electronic decoys, various types of thermal decoys are known in the prior art which include flares designed to attract infrared guided missiles. The flare or transponder of the decoy is designed to present a larger thermal or electronic target than the aircraft from which it is deployed and thereby attract the weapon away from the aircraft.

In those deployment systems in which the towed vehicle is electrically interfaced to the aircraft, the electronic data transmission between the towed vehicle and aircraft is typically facilitated by the tow line used to interconnect the towed vehicle to the aircraft. Data transmitting tow lines currently utilized generally comprises a core of standard conducting material extending throughout the tow line and forming an electrical communication line between the towed vehicle and the aircraft. However, the electrical conducting materials as currently utilized in many types of data transmitting tow lines are highly susceptible to RF (radio frequency) interference which diminishes the data transfer capability of the tow line. It has been found that the shortcomings of conventionally known data transmitting tow lines can be overcome through the use of a tow line having a fiber optic core to establish the communication link between the aircraft and the towed vehicle. Such a fiber optic link has the advantage of providing enhanced data transmission rates as well as eliminating susceptibility to RF interference.

Though some types of aerial targets are intended to be recoverable, the majority are intended to be non-recoverable or sacrificial. As will be recognized, decoys by their very nature are intended to be exclusively sacrificial since the tow line is typically cut at the aircraft at the end of a flight or mission. Though decoys and certain types of aerial targets are intended to be sacrificial, the need for rapid and reliable data exchange between the towed vehicles and the aircraft via the tow line is still of significant importance.

With regard to both recoverable and sacrificial towed vehicles, perhaps the most critical stage in the utilization of such towed vehicles lies in their initial deployment. As will be recognized, in the event a towed vehicle, and especially a decoy, is destroyed by a missile or other weapon, it is desirable to deploy a second decoy as rapidly as possible. The difficulty regarding deployment lies in the fact that the tow line must be able to withstand the extreme amount of tensile force exerted thereon by the drag of the vehicle during the deployment operation, particularly at the end of the payout of the vehicle.

In one currently known deployment technique, the tow line is wrapped or folded at either the aircraft end or the towed vehicle end and allowed to payout freely without braking. This particular deployment technique is primarily used in conjunction with sacrificial towed vehicles. In using this particular technique, the elasticity of the tow line must absorb the kinetic energy arising from the relative velocity of the towed vehicle to the aircraft at the end of the towed vehicle payout. As can be appreciated, oftentimes the tow line will snap during the deployment, rendering the target or decoy irretrievably lost. Additionally, this particular deployment technique is only effective at relatively low aircraft speeds since at higher aircraft speeds, the mass of the tow line itself prevents full use of its elasticity which typically results in line failure at the end of the payout. This particular technique also does not lend itself to the transmission of power and electronic information through the tow line. In this regard, since the tow line must possess such a high degree of elasticity so as not to snap, the line itself will typically cause the conductors within it to fail when it stretches. Thus, a tow line having a fiber optic core could not be used since the tow line elasticity would cause a failure of the fiber optics when the vehicle is deployed.

A second technique of rapidly deploying both sacrificial and recoverable towed vehicles involves the fixing of spools at either the aircraft or the towed vehicle to control the payout and braking of the tow line. The tow line is wrapped about the spool and allowed to be payed out in a controlled manner via the application of a mechanical braking force to the spool. In certain prior art systems of this type, rapid deployment of the towed vehicle is facilitated by utilizing a centrifugally applied brake in conjunction with a spool having a large outer to inner tow line diameter ratio. In the centrifugally applied brake, springs are typically used to hold off brake elements in a centrifugal clutch until a desired rotational speed of the spool for brake engagement is achieved. In other types of centrifugally applied brakes, shear pins or detents are used to hold off the brake elements. Once a desired rotational speed of the spool is achieved, the pins shear thus facilitating brake engagement.

In the prior art centrifugally applied brakes, the brake elements must be sized to provide the braking needed to prevent excessive tow line loads at the end of a maximum airspeed launch of the towed vehicle. However, when this braking requirement is met, the deployment time of a towed vehicle at a minimum airspeed launch is typically three times that of a maximum airspeed launch. This three-fold increase in the deployment time is attributable to the large range of airspeeds that modern military aircraft are capable of flying. As will be recognized, due to the importance of deploying a second decoy as rapidly as possible upon the destruction of an initially deployed decoy, the significant increase in deployment time at low aircraft speeds is highly undesirable. Additionally, those centrifugally applied brakes which incorporate springs generally do not fit into the space constraints of a typical decoy payout system since the springs needed to produce the necessary holding force (to account for friction wear of the brake pads) are too large. The springs also produce a hold-off force which is linearly proportional to displacement, thus allowing some brake engagement at low rotational speeds while producing ever-increasing brake hold-off forces as the brake pad wears during a high airspeed deployment. The centrifugally applied brakes which incorporate shear pins are also undesirable in that the brake elements are applied fully upon the shearing of the pins. Such application of the brake elements may reduce the rotational speed of the spool well below that desired, since the brake will remain fully engaged.

The shortcomings of the prior art centrifugally applied brakes would be overcome by a braking system that was designed to prevent any brake engagement below a predetermined rotational speed of the spool and allow full engagement regardless of brake displacement (due to wear) above that predetermined rotational speed. Importantly, the present invention comprises a centrifugally applied braking apparatus incorporated into a towed vehicle deployment system which meets these objectives, while consuming an absolute minimum of space so as to allow the same to be easily fitted within conventional towed vehicle deployment systems. Additionally, the present invention addresses the deficiencies associated with increased deployment times by holding off the engagement of the brake elements entirely until a spool rotational speed is reached that would require braking in order to prevent excessive tow line loads at the end of the towed vehicle payout. In particular, the present braking apparatus reduces the typical 3 to 1 payout time ratio between minimum and maximum airspeed deployment to approximately a 1.5 to 1 ratio.

SUMMARY OF THE INVENTION

In accordance with a preferred embodiment of the present invention, there is provided a towed vehicle deployment apparatus comprising a rotatable spool which itself comprises a rotor portion having a cylindrical outer surface, an inner surface, a central compartment defined by the inner surface, and at least one opening extending radially from the outer surface to the central compartment. The spool is rotatably connected to a stationary brake drum in a manner wherein the rotor portion resides within the brake drum and the outer surface of the rotor portion is disposed in sliding contact with the cylindrical inner surface of the brake drum. Dispensably stored in windings about the spool is a tow line, while connected to the tow line is a decoy.

The deployment apparatus further includes a mechanical brake assembly which comprises at least one brake element disposed within the central compartment and opening of the rotor portion. The brake element is adapted to yield at a predetermined rotational speed of the spool and move radially outward within the opening upon yielding so as to contact the inner surface of the brake drum and apply a braking force to the spool.

In the preferred embodiment, the brake element comprises a brake pad and weight member which are attached to each other and slidably received into the opening. Rigidly attached to the weight member is a support element which is disposed within the central compartment. The support element defines a central portion which is rigidly attached to the approximate center of the weight member via a weld and opposed end portions which are abutted against the inner surface of the rotor portion adjacent the opening. The support element is adapted to yield at the predetermined rotational speed of the spool in a manner allowing the brake pad to move radially outward within the opening and into contact with the inner surface of the brake drum. The rotor portion preferably includes a pair of openings disposed therein in opposed relation, with the brake assembly comprising a pair of brake elements which are disposed within the central compartment and respective ones of the openings.

BRIEF DESCRIPTION OF THE DRAWINGS

These, as well as other features of the present invention, will become more apparent upon reference to the drawings wherein:

FIG. 1 is a perspective view of the towed vehicle deployment apparatus constructed in accordance with the present invention;

FIG. 2 is a perspective view of the spool of the deployment apparatus having a mechanical brake assembly disposed within the rotor portion thereof;

FIG. 3 is a perspective view of a brake element of the brake assembly;

FIG. 4 is a partial end view of the rotor portion of the spool illustrating a brake element in a non-yielded configuration;

FIG. 4a is a partial end view of the rotor portion of the spool illustrating a brake element in a yielded configuration; and FIG. 5 is a graph comparing the performance characteristics of a brake element and a linear spring as a function of spool rotational speed and radial displacement.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a towed vehicle deployment apparatus 10 constructed in accordance with the present invention. As seen in FIGS. 1 and 2, the deployment apparatus 10 comprises a rotatable spool 12 defining an elongate, tubular central portion 14 having a pair of circularly configured end plates 16 attached to the opposed ends thereof in a manner wherein the central portion 14 extends axially therebetween. The spool 12 further includes a cylindrically configured rotor portion 18 which is attached to the outer surface of one of the end plates 16. The rotor portion 18 includes an outer surface 20 and an inner surface 22 which defines a cylindrically configured central compartment 24. Extending radially from the outer surface 20 of the rotor portion 18 to the central compartment 24 is at least one, and preferably a pair, of openings 26 which are disposed in opposed relation. As best seen in FIG. 2, each of the openings 26 has a generally square configuration and extends from the distal end of the rotor portion 18 toward the outer surface of the end plate 16 to which the rotor portion 18 is attached, terminating just short thereof.

In the preferred embodiment, the spool 12 is rotatably connected to a stationary brake drum 28 which defines a cylindrical inner surface 30. Though not shown, the rotatable connection of the spool 12 to the brake drum 28 is facilitated by the receipt of an extension of the central portion 14 which extends axially through the central compartment 24 into a bearing disposed within the brake drum 28. When the spool 12 is rotatably connected to the brake drum 28, the rotor portion 18 resides within the brake drum 28 and the outer surface 20 of the rotor portion 18 is disposed in sliding contact with the inner surface 30 of the brake drum 28.

Dispensably stored in windings about the spool 12, and in particular the central portion 14 thereof, is a tow line 32. The tow line 32 is maintained upon the central portion 14 by the end plates 16. Additionally, the tow line 32 is sized such that when completely wound about the central portion 14, the outer-most layer thereof is substantially flush with the peripheral edges of the end plates 16. Though not shown, attached to the distal end of the tow line 32 is an aerial-towed vehicle such as an aerial target or aerial decoy.

In addition to the rotor portion 18 of the spool 12 being rotatably connected to the brake drum 28, the end plate 16, which does not include the rotor portion 18 attached thereto, is itself rotatably connected to a stationary, triangularly-configured support plate 34. Extending longitudinally relative the spool 12 (i.e., in parallel relation to the central portion 14) in spaced relation to the outer-most layer of the tow line 32 is a guide bar 36, a stand-off bar 38, and a brace bar 40, the opposed ends of which are rigidly attached to the brake drum 28 and support plate 34. The guide bar 36 defines an enlarged middle portion 42 having a slot 44 extending therethrough. Partially inserted into the slot 44 and rotatably connected to the middle portion 42 is a pulley 46. The brace bar 40 has a hexagonal cross-sectional configuration, with the stand-off bar 38 having a semi-circular cross-sectional configuration which defines a flat inner surface (disposed closest the tow line 32) and a convex outer surface.

As seen in FIG. 1, the deployment apparatus 10 is assembled in a manner wherein the tow line 32 extends from the spool 12, over the convex outer surface of the stand-off bar 38, and into the slot 44 disposed within the enlarged middle portion 42 of the guide bar 36. When extended through the slot 44, the tow line 32 is received into a complimentary channel formed in the peripheral edge of the pulley 46. As is discussed in detail in Applicant's copending application entitled TOWED VEHICLE DEPLOYMENT APPARATUS HAVING GUIDE TO REDUCE LINE PULL-OFF ANGLE, the extension of the tow line 32 over the stand-off bar 38 is adapted to effectively increase the distance from the point where the tow line 32 leaves the spool 12 to the guide bar 36, thereby reducing the pull-off angle and minimizing occurrences of tow line breakage during the deployment of a towed vehicle at high airspeeds.

Referring now to FIGS. 2–4, the deployment apparatus 10 further includes a brake assembly which comprises at least one, and preferably a pair, of identically configured brake elements 48 which are disposed within the central compartment 24 of the rotor portion 18 and respective ones of the openings 26. As will be discussed in more detail below, the brake elements 48 are adapted to yield at a predetermined rotational speed of the spool 12 and move radially outward within the openings 26 upon yielding, so as to contact the inner surface 30 of the brake drum 28 and apply a brake force to the spool 12.

In the preferred embodiment, each of the brake elements 48 comprises a brake pad 50 defining a front surface 52 which is radiused so as to conform to the contour of the inner surface 30 of the brake drum 28. Rigidly attached to the back surface of the brake pad 50 is a weight member 54 having a length substantially equal to the length of the brake pad 50 and a width slightly less than the width of the brake pad 50. When attached to each other, the top and bottom surfaces of the brake pad and weight member 54 are substantially flush, with the side surfaces of the weight member 54 being uniformly offset from the side surfaces of the brake pad 50. The brake pad 50 is preferably fabricated from a semi-rigid material, with the weight member 54 preferably being fabricated from stainless steel.

In addition to the brake pad 50 and weight member 54, each brake element 48 further includes a rectangularly configured support element 56 which is rigidly attached to the back surface of the weight member 54 and preferably comprises a metal strip. As best seen in FIGS. 3 and 4, the support element 56 has a bent configuration and defines a central portion 58 which is rigidly attached to the approximate center of the back surface of the weight member 54, and a pair of end portions 60 which extend angularly away from the back surface of the weight member 54 when the central portion 58 is attached thereto. The length of the support element 56 is substantially equal to the length of the brake pad 50 and weight member 54. As such, when the support element 56 is attached to the weight member 54, the top and bottom edges thereof are substantially flush with the top and bottom surfaces of the weight member 54 and brake pad 50. The rigid attachment of the central portion 58 of the support element 56 to the back surface of the weight member 54 is preferably facilitated by a weld, though it will be recognized that other attachment methods may also be utilized.

In the preferred embodiment, the brake elements 48 are inserted into the rotor portion 18 of the spool 12 in a manner wherein the brake pad 50 and weight member 54 of each brake element 48 are slidably received into respective ones of the openings 26, with the support element 56 of each brake element 48 being disposed within the central compartment 24. When disposed within the central compartment 24, the end portions 60 of each support element 56 are abutted against the inner surface 22 of the rotor portion 18 adjacent a respective one of the openings 26. The length and width dimensions of each brake pad 50 are substantially identical to the length and width dimensions of the openings 26.

Referring now to FIGS. 4 and 4a, the strip of metal from which each support element 56 is fabricated is adapted to yield or permanently deform at a predetermined rotational speed of the spool 12 in a manner allowing the brake pad 50 to move radially outward within a respective one of the openings 26, thus allowing the radiused front surface 52 thereof to come into direct contact with the inner surface 30 of the brake drum 28. As shown in FIG. 4, the support element 56 is in a non-yielded configuration, thus facilitating the formation of a uniform gap 62 between the front surface 52 of the brake pad 50 and the inner surface 30. As shown in FIG. 4a, upon the spool 12 reaching the predetermined rotational speed, the support element 56 yields, thus facilitating the outward radial movement of the brake pad 50 within the opening 26 and the engagement of the front surface 52 thereof to the inner surface 30 of the brake drum 28.

As will be recognized, the yielding of the support element 56 occurs as a result of the centrifugal force exerted thereupon by the weight member 54, and to a lesser extent the brake pad 50, during the rotation of the spool 12. As the rotational speed of the spool 12 and hence the rotor portion 18 increases, the centrifugal force exerted on the support element 56 likewise increases, eventually resulting in the yielding of the support element 56 at a certain rotational speed of the spool 12. As previously explained, the yielding of the support element 56 facilitates the outward radial movement of the brake pad 50 within the opening 26 and the engagement of the front surface 52 thereof to the inner surface 30 of the brake drum 28. Importantly, the rotational speed at which the support element 56 will yield is a function of its material composition and thickness. In this respect, the stronger the material and/or thicker the construction of the support element 56, the greater the rotational speed of the spool that will be needed to exert the centrifugal force needed to facilitate the yielding of the support element 56.

Referring now to FIG. 5, in those prior art centrifugally applied brakes incorporating springs, the springs produce a hold-off force which is linearly proportional to radial displacement, thus causing some brake engagement at rotational speeds of the spool which are below those at which brake engagement is desired. The use of such springs also facilitates the production of increasing brake hold-off forces as the brake pad of the centrifugally applied brake wears during a high airspeed deployment. Due to these performance characteristics of the linear spring, the deployment time of the towed vehicle is significantly increased. This increased deployment time is highly undesirable, particularly in relation to the utilization of towed decoys wherein a second decoy must be deployed as rapidly as possible upon the destruction of a first deployed decoy. The performance characteristics of the spring also result in the deployment time of a towed vehicle at a minimum airspeed launch typically being about twice that of a maximum airspeed launch. Further, the size of the springs generally do not allow those prior art centrifugally applied brakes incorporating the same to be fit into the space constraints of a typical decoy pay-out system due to the large size of the springs needed to produce the necessary brake hold-off forces to account for friction wear of the brake pad.

In the present deployment apparatus 10, the complete yielding of the support elements 56 of the brake elements 48 occurs only after the spool 12 has reached a predetermined rotational speed. As such, prior to the spool 12 reaching such rotational speed, no braking force is applied thereto. Subsequent to the yielding of the support elements 56, the braking force applied to the spool 12 attributable to the contact between the front surfaces 54 of the brake pads 50 and the inner surface 30 of the brake drum 28 is substantially constant despite any wear of the brake pads 50. As such, the utilization of the brake elements 48 optimizes the speed of the towed vehicle deployment, and reduces the ratio between minimum and maximum airspeed deployment to approximately 1.5:1. Additionally, due to the small size of the brake elements 48 and the manner in which they are received into the openings 26 and central compartment 24 of the rotor portion 18, the deployment apparatus 10 consumes a minimum amount of space thus allowing the same to be easily fitted within conventional towed vehicle deployment systems. As previously explained, the amount of braking force applied by the brake elements 48 and the spool rotational speed at which the brake elements 48 will yield can be selected by varying the material composition and thickness of the support elements 56 thereof.

Additional modifications and improvements of the present invention may also be apparent to those skilled in the art. Thus, the particular combination of parts described and illustrated herein is intended to represent only one embodiment of the present invention, is not intended to serve as limitations of alternative devices within the spirit and scope of the invention.

What is claimed is:

1. A towed vehicle deployment apparatus comprising:
   a rotatable spool comprising a rotor portion having a cylindrical outer surface, an inner surface, a central compartment defined by said inner surface, and at least one opening extending radially from said outer surface to said central compartment;
   a stationary brake drum defining a cylindrical inner surface, said spool being rotatably connected to said brake drum in a manner wherein said rotor portion resides within said brake drum; and
   a brake assembly comprising at least one brake element disposed within said central compartment and said opening, said brake element being configured to permanently deform at a predetermined rotational speed of the spool and move radially outward within said opening upon yielding so as to contact the inner surface of the brake drum and apply a braking force to the spool.

2. The apparatus of claim 1 wherein said brake element comprises:
   a brake pad slidably received into said opening; and
   a support element disposed within said central compartment and attached to said brake pad, said support element being adapted to permanently deform at the predetermined rotational speed of the spool in a manner allowing said brake pad to move radially outward within said opening and into contact with the inner surface of the brake drum.

3. The apparatus of claim 2 wherein said support element defines a central portion rigidly attached to said brake pad and opposed end portions abutted against the inner surface of the rotor portion adjacent the opening.

4. The apparatus of claim 3 wherein said brake element further comprises a weight member attached to said brake pad and slidably received into said opening, said support element being rigidly attached to said weight member.

5. The apparatus of claim 4 wherein said weight member is fabricated from metal and said support element comprises a metal strip rigidly attached to the approximate center of the weight member via a weld.

6. The apparatus of claim 5 wherein said weight member is fabricated from stainless steel.

7. The apparatus of claim 1 wherein said rotor portion includes a pair of openings disposed therein in opposed relation, and said brake assembly comprises a pair of brake elements disposed within said central compartment and respective ones of said openings, said brake elements moving radially outward within said openings and into contact with the inner surface of the brake drum upon permanently deforming.

8. A towed vehicle deployment apparatus comprising:
   a rotatable spool comprising a rotor portion;
   a stationary brake drum, said spool being rotatably connected to said brake drum in a manner wherein said rotor portion resides therewithin; and
   a brake assembly comprising at least one brake element disposed within said rotor portion, said brake element being configured to permanently deform at a rotational speed of the spool and contact the brake drum upon yielding so as to apply a braking force to the spool.

* * * * *